PULSE GENERATING CIRCUIT INSENSITIVE TO INPUT CONTROL SWITCH CONTACT BOUNCE

Filed June 18, 1963

Inventor
Paul M. Kintner
By H R Rather
Attorney

United States Patent Office 3,230,394
Patented Jan. 18, 1966

3,230,394

PULSE GENERATING CIRCUIT INSENSITIVE TO INPUT CONTROL SWITCH CONTACT BOUNCE

Paul M. Kintner, Huntington Station, N.Y., assignor to Cutler-Hammer, Inc., Milwaukee, Wis., a corporation of Delaware Filed June 18, 1963, Ser. No. 288,829
6 Claims. (Cl. 307—88.5)

This invention relates to a pulse generating circuit.

Pulse generating circuits are well known and have many uses in computer and static logic circuits for driving counters, flip-flops, shift registers and the like. In certain applications such generating circuits are initiated into operation by closing of mechanical or electroresponsive switches. Contact "bounce" very often occurs for short periods following closure of switch contacts and the repeated reopening and reclosure of the latter can be troublesome in causing aborted operation, or in causing additional false operations of the pulse generating circuit.

It is a primary object of my invention to provide an improved pulse generating circuit which is insensitive to reopening and reclosure of its input circuit for a period following each closure of such circuit.

Another object is to provide a pulse generating circuit which can provide either a series of two output voltage pulses or a single output pulse for each operation.

My improved pulse generating circuit utilizes four transistors which have their emitter-collector circuits connected across a source of constant D.C. potential. The pulse output terminals are connected across the emitter-collector circuits of two of such transistors and provide a sequence of two negative-going pulses when one, then the other of such transistors are momentarily rendered non-conducting for time intervals determined by capacitor discharge circuits individual thereto. A third normally non-conducting transistor, when made conducting renders the capacitor discharge circuit associated with one of the first mentioned transistors operative to momentarily turn-off and then turn-on that transistor to provide the first of the two voltage pulses. The momentary turn-off and then turn-on of the last mentioned transistor in turn renders the capacitor discharge circuit associated with the other of the two first mentioned transistors effective to momentarily turn-off and then turn-on the last mentioned transistor to afford development of the second of the series of the two voltage pulses. Turn-on of the third mentioned transistor is controlled by the fourth transistor which is normally turned on. Turn-off of the fourth transistor renders the third mentioned conducting. The fourth transistor is arranged to be rendered non-conducting by closure of a switch, and through means of a third capacitor discharge circuit, I insure that the fourth transistor is maintained non-conducting for a given interval even though the switch may reopen once or repeatedly during that interval due to switch contact bounce or the like.

The accompanying drawing illustrates preferred embodiments of my invention which will now be described in detail. It is to be understood that my invention is susceptible of modification with respect to details without departing from the scope of the appended claims.

Figures 1, 3:
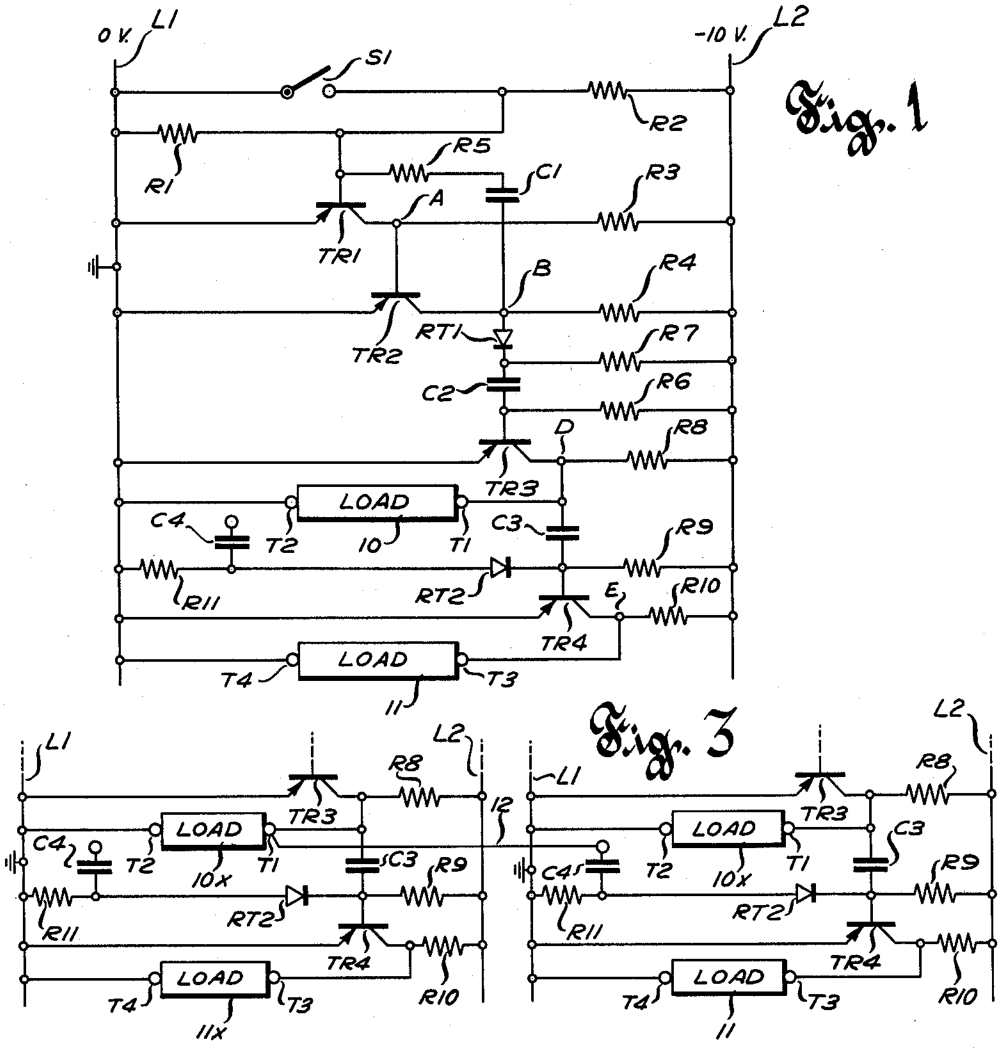
FIGURE 1 is a diagrammatic showing of a pulse generating circuit incorporating the invention.
FIG. 3 is a showing of similar portions of two pulse generating circuits in accordance with FIG. 1 which are interconnected for a certain type of operation.

Referring to FIG. 1 lines L1 and L2 comprise a D.C. voltage supply in which line L1 may be assumed to be a ground or 0 volts and line L2 at a potential of −10 volts. A transistor TR1 has its base connected to line L1 in series with a resistor R1, and to line L2 in series with a resistor R2. A switch S1 is connected between line L1 and a base of transistor TR1 and when closed shunts resistor R1 for the purpose that will hereinafter be more fully explained. The emitter of transistor TR1 is connected to line L1 and its collector is connected to line L2 in series with a resistor R3.

A second transistor TR2 has its base connected to a point A common between the collector of transistor TR1 and resistor R3. The emitter of transistor TR2 is connected to line L1 and its collector is connected to line L2 in series with a resistor R4. A resistor R5 is connected in series with a capacitor C1 between the base of transistor TR1 and a point B between the collector of transistor TR2 and resistor R4.

A third transistor TR3 has its base connected in series with a resistor R6 to line L2, and in series with a capacitor C2 and a diode RT1, to the aforementioned point B. A resistor R7 is connected from the point common between capacitor C2 and rectifier RT1 and line L2. Transistor TR3 has its emitter connected to line L1 and its collector connected in series with a resistor R8 to line L2. A pulse output terminal T1 is connected to a point D between the collector of transistor TR3 and resistor R8, and its companion terminal T2 is connected directly to line L1. A load 10 is shown connected between terminals T1 and T2 to be supplied with pulses as will be later more fully explained.

A fourth transistor TR4 has its base connected to line L2 in series with a resistor R9 and to the aforementioned point D in series with a capacitor C3. Transistor TR4 has its emitter connected to line L1 and its collector is connected in series with a resistor R10 to line L2. A pulse output terminal T3 is connected to a point E between the collector of transistor TR4 and resistor R10, and its companion terminal T4 is connected to line L1. A load 11 is shown connected betwen terminals T3 and T4 for supply of pulses thereto. A resistor R11 is connected from line L1 in series with a half-wave rectifier RT2 to the base of transistor TR4. A capacitor C4 has the lower plate thereof connected to the point common between resistor R11 and diode RT2 for a purpose that will hereinafter be described in conjunction with FIG. 3.

With the pulse generating circuit in the condition shown in FIG. 1 the upper plate of capacitor C1 will be at 0 volts due to charging current flow from line L1 through resistors R1 and R5, capacitor C1, and through resistor R4 to line L2. Transistor TR1, due to current flow from line L1 through its emitter-base circuit and resistor R2 to line L2, will be fully conducting. Thus point A, and hence the base of transistor TR2, will be at 0 volts. Consequently, the emitter-collector circuit of transistor TR2 will be held non-conducting and point B will accordingly be at −10 volts.

Transistor TR3, due to current flow from line L1 through its emitter-base circuit and resistor R6 to line L2 will have its emitter-collector circuit fully conducting. Thus point D will be at 0 volts and the lower plate of capacitor C2 will be approximately at the same voltage. It will be apparent that charging current flow from line L1 through the emitter-base circuit of transistor TR3 and capacitor C2 to line L2 will be confined to resistor R7 due to the presence of rectifier RT1 which blocks current flow to point B. Transistor TR4, due to current flow from line L1 through the emitter-base circuit of transistor TR4 and resistor R9 will have its emitter-collector circuit fully conducting. Thus the point E will be at 0 volts and both plates of capacitor C3 will be at approximately 0 volts. With terminals T1–T2 and T3–T4 all at 0 volts loads 10 and 11 will not be subjected to any voltage pulses.

Now let it be assumed that switch S1 is closed. Such closure results in the base of transistor TR1 being connected directly to line L1 raising it to 0 volts, thereby rendering the emitter-collector circuit of such transistor non-conducting. Point A then suddenly decreases toward −10 volts, but after a small decrease current flows from line L1 through the emitter-base circuit of transistor TR2, point A and resistor R3 to line L2. This clamps point A at slightly less than 0 volts and renders the emitter-collector circuit of transistor TR2 fully conducting. Accordingly, point B is suddenly shifted from −10 to 0 volts. Thus the upper plate of capacitor C2 which was at −10 volts is suddenly at 0 volts, and the lower plate which was at 0 volts is then raised to +10 volts relative to line L2. Accordingly, current will flow from capacitor C2 through resistor R6 to line L2. Because of current flow from capacitor C2 through resistor R6 the voltage drop across the latter will raise the base of transistor TR3 to a potential rendering the emitter-collector circuit of the latter non-conducting. Thus point D will suddenly shift from 0 volts to a lower voltage determined by the impedances of resistor R8 and load 10. If these impedances are equal, which is normally the practice, the point D will shift from 0 to −5 volts. If switch S1 is closed at instant *t1* depicted in FIG. 2, the voltage at terminal T1 will suddenly drop from 0 to −5 volts.

As capacitor C2 discharges through resistor R6, the voltage drop across the latter decreases, and the potential of the base of transistor TR3 decreases and then reaches a value causing the emitter-collector circuit of transistor TR3 to become fully conducting again. Point D is then shifted from −5 to 0 volts with terminal T1 being correspondingly shifted in potential as depicted at the instant *t2* on graph (*a*) of FIG. 2. Thus as shown in graph (*a*) FIG. 2, a negative-going voltage pulse occurs between terminals T1 and T2 whose duration is a function of the time constant of capacitor C2 and resistor R6.

During the interval *t1–t2* when the emitter-collector circuit of transistor TR3 is non-conducting and point D is shifted from 0 to −5 volts, capacitor C3 discharges through resistor R8 to line L2. When TR3 again becomes fully conducting the point D, and hence the upper plate of capacitor C2, suddenly shifts from −5 to 0 volts. Consequently, current will flow from the lower plate of capacitor C3 through resistor R9 to line L2 rectifier RT2 preventing any current flow through resistor R11 to line L1. The voltage drop across resistor R9 will then be such as to raise the potential of the base of transistor TR4 to a value rendering the emitter-collector circuit of the latter non-conducting. Thus point E will be suddenly shifted from 0 to −5 volts, assuming that impedances of resistor R10 and load 11 are equal. This is depicted by the vertical line at the instant *t2* in graph (*b*) of FIG. 2.

Figure 2:
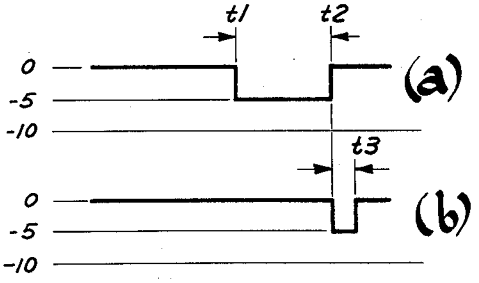
FIG. 2 is a graphic representation of output pulses which may be obtained from the circuit of FIG. 1.

As capacitor C3 discharges the voltage drop across resistor R9 decreases and at the instant *t3* depicted in graph (*b*) of FIG. 2 the potential on the base of transistor TR4 decreases to a value rendering the emitter-collector circuit of the latter fully conducting. Thus point E, and hence terminal T3, is suddenly shifted from −5 to 0 volts. During the interval *t2–t3* load 11 will be subjected to the negative-going voltage pulse depicted in graph (*b*) of FIG. 2. The duration of the voltage pulse across load 11 will be dependent upon the time constant of capacitor C3 and resistor R9.

The foregoing description of circuit operation presupposes that when switch S1 is closed it remains closed at least until the series of two pulses are developed across terminals T1–T2 and T3–T4. It is an important feature of my circuit that single or repeated reopenings of switch S1, such as occur because of contact "bounce" will not result in aborting the generation of the two pulses, or in false generation of more than one series of such pulses. When the emitter-collector circuit of transistor TR2 becomes conducting as a result of initial closure of switch S1 point B suddenly shifts from −10 to 0 volts and the lower plate of capacitor C1 is then accordingly at the same voltage relative to line L2. Consequently, the upper plate of capacitor C1 which was initially at 0 volts is suddenly raised to +10 volts relative to line L2. Now if switch S1 should reopen, either once or repeatedly following initial closure, capacitor C1 will discharge through resistors R5 and R2 to line L2. The voltage drop across resistor R5 due to such discharge will maintain the potential of the base of transistor TR1 at a value insuring that the emitter-collector circuit of such transistor will be held non-conducting.

The interval when the last mentioned action will be effective is a function of the time constant of resistors R2 and R5 and capacitor C1, and also a function of the duration of the periods when switch S1 is in reopened condition. As will be noted capacitor C1 will discharge from +10 down to 0 volts on its upper plate but such discharge only occurs when switch S1 is open. Thus, the interval will be variable but limited in extent.

Switch S1 must be reopened for a period sufficient to render the emitter-collector circuit of transistor TR1 conducting again before a subsequent series of pulses will be generated across terminals T1–T2 and T3–T4. This condition is reached when the potential of the base of transistor TR1 decreases to its original value, slightly below 0 volts. Diode RT1 in addition to confining capacitor C2 charging current flow through resistor R7 also insures that the discharge circuit of capacitor C1 will not be subjected to discharge current flow from capacitor C2. This insures that the circuit will reset rapidly and that contact bounce which may occur on reopening of switch S1 will not cause false operations.

It will be appreciated that other devices may be used in lieu of switch S1 to initiate operation of my pulse generator circuit. For example, another transistor can be used in which case its emitter-collector circuit would be connected between line L1 and the base of transistor TR1, and its base would in turn be connected in series with a resistor to line L2.

FIG. 3 shows how two pulse generating circuits described in connection with FIG. 1 may be connected together to afford operation of one by the other to provide a single output pulse across terminals T3–T4 of the former. It may be assumed that the left-hand circuit of FIG. 3 is initiated in its operation by a switch like switch S1 in FIG. 1. Terminal T1 of the left-hand circuit is connected through a line 12 to the upper plate of capacitor C4 in the right-hand circuit. If the left-hand circuit is not supplying pulses to loads connected across its set of terminals T1–T2 and T3–T4 then dummy loads 10X and 11X having impedances equal to resistors R8 and R10, respectively, would be connected across such terminals.

With the two pulse generator circuits connected as shown in FIG. 3 the lower plate of capacitor C3 in the left-hand circuit and the corresponding plates in capacitors C3 and C4 in the right-hand circuit will be at 0 volts. When transistor TR3 of the left-hand circuit goes non-conducting for the interval *t1–t2* as hereinbefore described, the upper plates of capacitor C3 of the left-hand circuit and capacitor C4 of the right-hand circuit both discharge to −5 volts through resistor R8 of the left-hand circuit. When left-hand circuit transistor TR3 again becomes fully conducting the upper plate of capacitor C4 suddenly shifts from −5 to 0 volts thus making its lower plate +5 volts relative to line L2. Accordingly, discharge current then flows from the lower plate of capacitor C4 through diode RT2 and resistor R9 to line L2 in the right-hand circuit. The voltage drop across resistor R9 is then such as to raise the potential or base of transistor TR4 to a value rendering the latter non-conductive, and consequently a voltage pulse like that depicted in graph (*b*) of FIG. 2 will be developed across the load 11 in the right-hand circuit.

In one embodiment of my pulse generating circuit, the capacitors, resistors, rectifiers and transistors were chosen in accordance with the following schedule:

| | |
|---|---|
| Transistors TR1 to TR4(PNP) | 2N404. |
| Rectifiers RT1 and RT2 | CTP462. |
| R1 | 470 ohms. |
| R2 | 1K ohms. |
| R3 | 1.5K ohms. |
| R4 | 470 ohms. |
| R5 | 6.8K ohms. |
| R6 | 430 ohms. |
| R7 | 10K ohms. |
| R8 | 390 ohms. |
| R9 | 1K ohm. |
| R10 | 390 ohms. |
| R11 | 4.7K ohms. |
| C1 | 15 $\mu$f. |
| C2 | .82 $\mu$f. |
| C3 | .015 $\mu$f. |
| C4 | .015 $\mu$f. |

With the components and values thereof as set forth above, the duration of the negative-going pulses across terminals T1–T2 is 150 microseconds, and the pulse across T3–T4 has a duration of 4 microseconds. Any single or repeated reopening of switch S1 within 50 milliseconds of its initial closure will insure that a single series of pulses will be generated. Assuming no unwanted reopening of switch S1, it must then be reopened for a period in excess of 50 milli-seconds to insure reset of the circuit for generation of subsequent series of pulses.

I claim:

1. In combination, a source of D.C. potential, first, second and third transistors having their emitter-collector circuits connected across said source, means in circuit with said source and the bases of said first and third transistors rendering such transistors normally conducting, means in circuit with one side of the emitter-collector circuit of said first transistor and the base of said second transistor to hold the latter non-conducting whenever the former is conducting, means for selectively connecting the base of said first transistor to one side of said source to render the same non-conducting and said second transistor conducting, means including a capacitor in circuit with the base of said first transistor and said source which acts to maintain said first transistor non-conducting for a capacitor discharge interval following connection of the base of said first transistor to said one side of said source, means including a second capacitor in circuit with one side of the emitter-collector circuit of said second transistor and the base of said third transistor which acts upon said second transistor becoming conducting to render said third transistor non-conducting for an interval depending upon a discharge period of said second capacitor, and means for deriving voltage pulses across the emitter collector circuit of said third transistor in accordance with the latter's interval of non-conduction.

2. The combination according to claim 1, together with a fourth transistor which has its emitter-collector circuit connected across said source, means in circuit with said source and the base of said fourth transistor rendering the latter normally conducting, means including a third capacitor in circuit with said one side of the emitter-collector circuit of said third transistor and the base of said fourth transistor which acts upon said third transistor becoming reconducting following its interval of non-conduction to render said fourth transistor non-conducting for an interval depending upon a discharge period of said third capacitor, and means for deriving voltage pulses across the emitter-collector circuit of said fourth transistor in accordance with its interval of non-conduction.

3. The combination according to claim 2, together with a fourth capacitor which is in circuit on one side with the base of said fourth transistor and which is connectable on its other side to the said one side of the emitter-collector circuit of the third transistor in another like circuit so that said fourth transistor will be non-conducting for an interval as aforestated when said third transistor in the other like circuit becomes reconducting following its aforesaid interval of non-conduction.

4. The combination according to claim 1, wherein said means for selectively connecting the base of said first transistor to one side of said source includes a switch closable to connect such base to said one side of said source and operable to disconnect it therefrom.

5. The combination according to claim 1, wherein said means including a capacitor in circuit with one side of said emitter-collector circuit of said second transistor and the base of said third transistor further includes a unidirectional conducting device which is poled to prevent the emitter-collector circuit of said transistor from being subjected to the capacitor charging and discharging current.

6. The combination according to claim 2, wherein said transistors are each of the P-N-P type, wherein the bases of said first, third and fourth transistor and the collectors of all of said transistors are connected in series with individual resistors to the low potential side of said source, and wherein the base of said second transistor is connected directly to the point common between the collector of said first transistor and the associated series resistor of the latter.

No references cited.

ARTHUR GAUSS, *Primary Examiner.*